(12) United States Patent
Park et al.

(10) Patent No.: US 8,300,330 B2
(45) Date of Patent: Oct. 30, 2012

(54) LENS DRIVING APPARATUS

(75) Inventors: Sang Ok Park, Gwangju (KR); Sang Jun Min, Gyeonggi-do (KR); Sang Hee Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/302,547

(22) Filed: Nov. 22, 2011

(65) Prior Publication Data

US 2012/0069461 A1    Mar. 22, 2012

Related U.S. Application Data

(63) Continuation of application No. 13/051,291, filed on Mar. 18, 2011, now Pat. No. 8,089,703, which is a continuation of application No. 12/518,976, filed as application No. PCT/KR2007/006466 on Dec. 12, 2007, now Pat. No. 7,936,526.

(30) Foreign Application Priority Data

Dec. 13, 2006  (KR) .................. 10-2006-0127435
Dec. 13, 2006  (KR) .................. 10-2006-0127436

(51) Int. Cl.
  *G02B 7/02*  (2006.01)
(52) U.S. Cl. .................. 359/814; 359/694; 359/824
(58) Field of Classification Search .................. 359/814, 359/824, 694
  See application file for complete search history.

(56) References Cited

U.S. PATENT DOCUMENTS

| 5,471,100 A | 11/1995 | Sakamoto et al. |
| 6,034,940 A | 3/2000 | Lee |
| 6,591,066 B2 | 7/2003 | Aoshima |
| 6,710,563 B2 | 3/2004 | Mizumaki et al. |
| 6,800,970 B2 | 10/2004 | Aoshima |
| 2006/0028929 A1* | 2/2006 | Osaka .................. 369/44.14 |
| 2006/0034599 A1 | 2/2006 | Osaka |
| 2006/0181748 A1 | 8/2006 | Makii et al. |

(Continued)

FOREIGN PATENT DOCUMENTS

DE    202006009115 U1    8/2006

(Continued)

OTHER PUBLICATIONS

Office Action dated Apr. 23, 2012 in Korean Application No. 10-2006-0127435, filed Dec. 13, 2006.

(Continued)

*Primary Examiner* — James Jones
(74) *Attorney, Agent, or Firm* — Saliwanchik, Lloyd & Eisenschenk

(57) ABSTRACT

Disclosed is a lens driving apparatus. The lens driving apparatus includes a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

20 Claims, 2 Drawing Sheets

U.S. PATENT DOCUMENTS

2006/0245085 A1    11/2006  Lee et al.
2008/0117536 A1*   5/2008   Higuchi .................. 359/824
2009/0237815 A1    9/2009   Kim

FOREIGN PATENT DOCUMENTS

| | | |
|---|---|---|
| JP | 10-334493 A | 12/1998 |
| JP | 2000-275490 A | 10/2000 |
| JP | 2005-128405 A | 5/2005 |
| JP | 2005-234089 A | 9/2005 |
| JP | 2005-258355 A | 9/2005 |
| JP | 2006-079072 A | 3/2006 |
| JP | 3124292 U | 7/2006 |
| JP | 2006-234866 A | 9/2006 |
| JP | 2008-026431 A | 2/2008 |
| KR | 10-0649638 B1 | 11/2006 |
| WO | WO-2005/088153 A1 | 9/2005 |

OTHER PUBLICATIONS

Office Action dated Apr. 23, 2012 in Korean Application No. 10-2006-0127436, filed Dec. 13, 2006.

Office Action dated Nov. 1, 2011 in Japanese Application No. 2009-541226, filed Dec. 12, 2007.

* cited by examiner

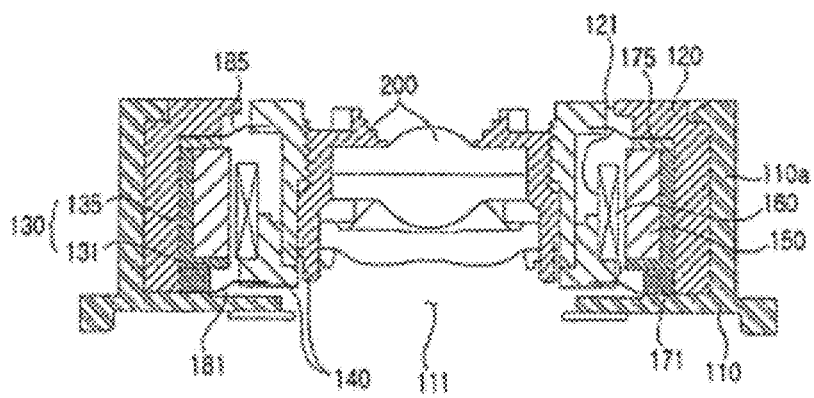
[Fig. 1]
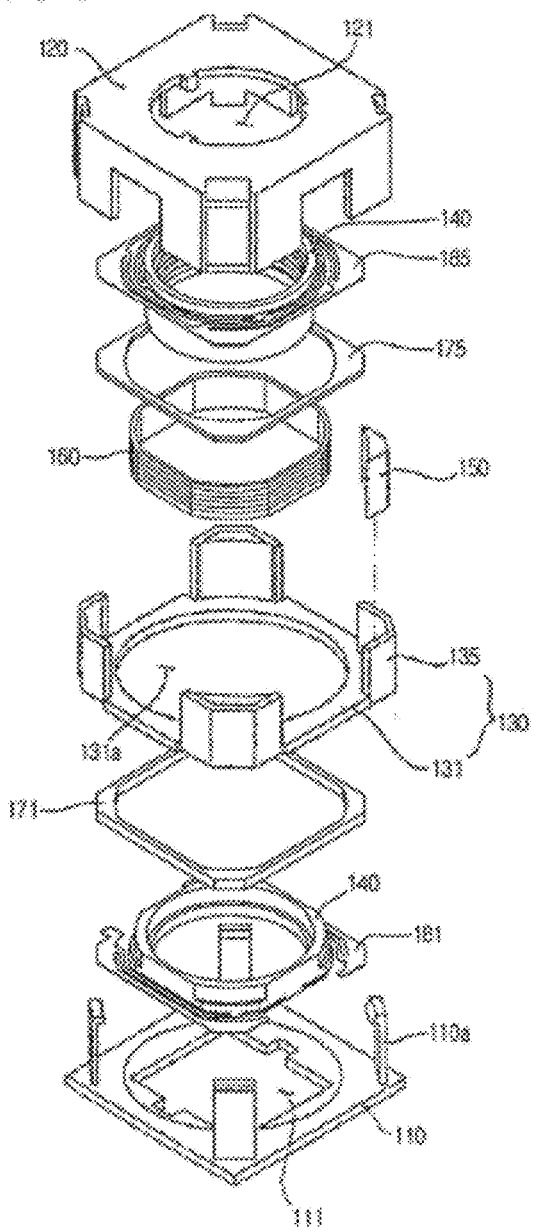
[Fig. 2]

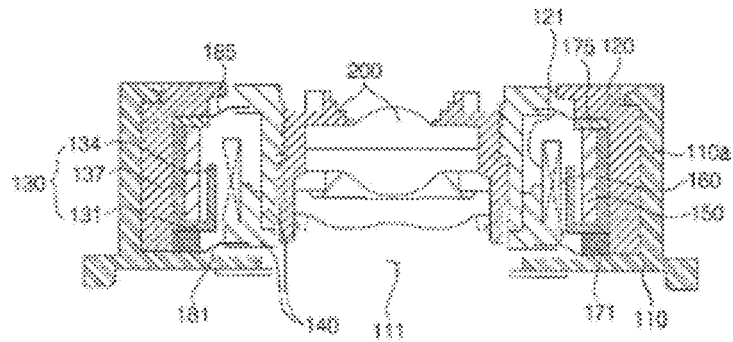
[Fig. 3]
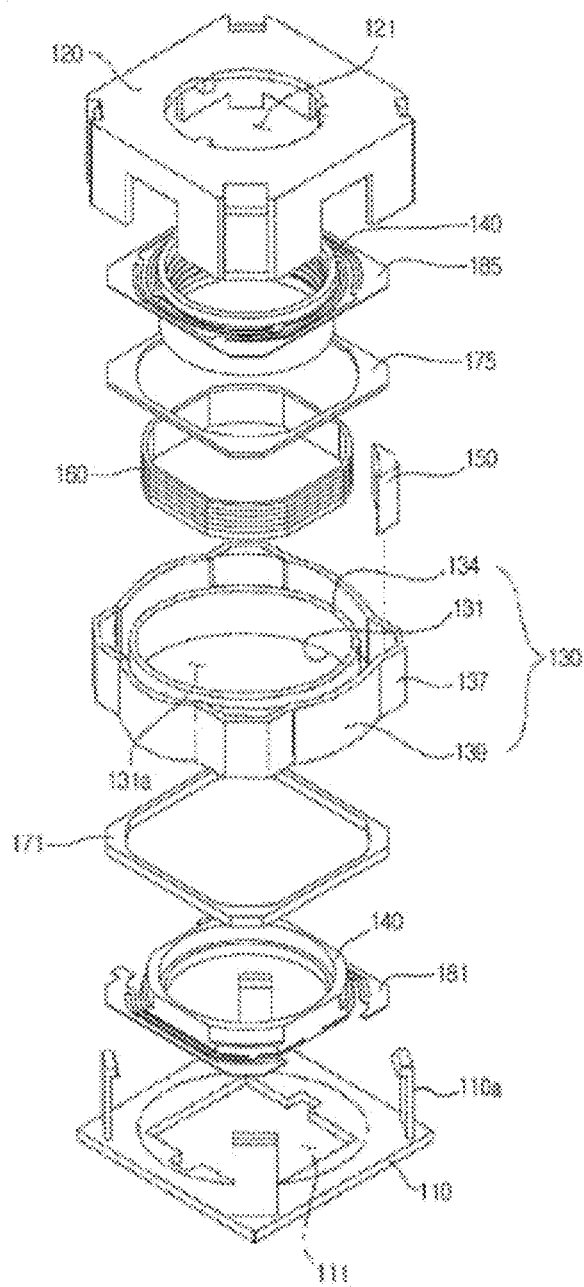
[Fig. 4]

LENS DRIVING APPARATUS

CROSS-REFERENCE TO RELATED APPLICATIONS

This application is a continuation of U.S. application Ser. No. 13/051,291, filed Mar. 18, 2011, which is a continuation of U.S. application Ser. No. 12/518,976, filed Jun. 12, 2009, which is the U.S. national stage application of international Patent Application No. PCT/KR2007/006466, filed Dec. 12, 2007, which claims priority to Korean Patent Application Nos. 10-2006-0127435, filed Dec. 13, 2006, and 10-2006-0127436, filed Dec. 13, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

Since the electronic appliances equipped with cameras are manufactured in a small size such that a user can carry the electronic appliances, parts for providing camera functions must also be manufactured in a small size. To this end, a dead space must be minimized in a lens driving apparatus that drives a lens of the camera.

Technical Problem

The embodiment provides a lens driving apparatus which can be fabricated in a small size. The embodiment provides a lens driving apparatus in which a dead space is minimized.

Technical Solution

The lens driving apparatus of the embodiment comprises a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

Advantageous Effects

The embodiment can provide a lens driving apparatus which can be fabricated in a small size. The embodiment can provide a lens driving apparatus in which a dead space is minimized.

BRIEF DESCRIPTION OF THE DRAWINGS

FIG. 1 is a sectional view of a lens driving apparatus according to a first embodiment;

FIG. 2 is an exploded perspective view of the lens driving apparatus shown in FIG. 1;

FIG. 3 is a sectional view of a lens driving apparatus according to a second embodiment; and FIG. 4 is an exploded perspective view of the lens driving apparatus shown in FIG. 3.

DETAILED DESCRIPTION

Hereinafter, a lens driving apparatus according to an embodiment will be described with reference to accompanying drawings.

FIG. 1 is a sectional view of a lens driving apparatus according to a first embodiment, and FIG. 2 is an exploded perspective view of the lens driving apparatus shown in FIG. 1.

Referring to FIGS. 1 and 2, the lens driving apparatus includes a base 110 and a housing 120, which are coupled to each other to form a predetermined space therebetween. The base 110 has a polygonal shape (e.g. rectangular plate shape) and a first opening 111 is formed at the center of the base 110. The housing 120 has a hexahedral structure and a bottom surface thereof is opened. Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a polygonal shape (e.g. rectangular plate shape) corresponding to the base 110 and is mounted on the base 110, and a vertical plate 135 provided at an outer peripheral portion of the horizontal plate 131 in correspondence with the outer peripheral portion of the housing 120.

A third opening 131a, which corresponds to the first opening 111 of the base 110, is formed in the horizontal plate 131, and the vertical plate 135 protrudes upward from the outer peripheral portion of the horizontal plate 131.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 135 of the yoke 130, and a coil 160 is disposed around the bobbin 140.

The coil 160 has a cylindrical structure or a polygonal structure and faces the magnet 150.

In the embodiment, the coil 160 has a substantially octagonal structure, in which edges of the coil 160 facing the magnet 150 are curved.

At this time, planes of the magnet 150 that face the coil 160 are also curved such that the electromagnetic field can be maximized. That is, the planes of the coil 160 and the magnet 150, which face to each other, have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

FIG. 3 is a sectional view of a lens driving apparatus according to a second embodiment, and FIG. 4 is an exploded perspective view of the lens driving apparatus shown in FIG. 3.

Referring to FIGS. 3 and 4, the lens driving apparatus includes a base 110 and a housing 120, which are coupled to each other to form a predetermined space therebetween. The base 110 has a rectangular plate shape and a first opening 111 is formed at the center of the base 110. The housing 120 has a hexahedral structure and a bottom surface thereof is opened.

Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a rectangular plate shape corresponding to the base 110 and is mounted on the base 110.

A third opening 131 a, which corresponds to the first opening 111 of the base 110, is formed at the center of the horizontal plate 131. In addition, a ring-shaped vertical wall 134 is formed on the horizontal plate 131 while surrounding the third opening 131a and vertical plates 134 protrude upward from corner edges of the horizontal plate 131. The vertical plates 137 are fixedly supported by edges of the housing 120.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed at an inner portion of the vertical wall 134 of in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 137 of the yoke 130, and a coil 160 is disposed around the bobbin 140. The coil 160 has a cylindrical structure or a polygonal structure and faces the vertical wall 134.

In the embodiment, the coil 160 has a substantially octagonal structure, in which edges of the coil 160 facing the magnet 150 are curved.

At this time, a plane of the magnet 150, which is arranged sequentially to the vertical wall 134, is curved corresponding to the curvature of the coil 160 and the vertical wall 134 such that the electromagnetic field can he maximized. That is, the coil 160, the plane of the magnet 150 facing the coil 160, and the vertical wall 134 have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

An outer peripheral portion of the horizontal plate 131, which is arranged between adjacent vertical plates 137 of the yoke 130, has a curvature corresponding to that of the vertical wall 134. In addition, a vertical connection plate 139 that connects the adjacent vertical plates 137 to each other is provided on the outer peripheral portion of the horizontal plate 131 in a curved shape. The vertical connection plate 139 prevents penetration of impurity and improves the aesthetic appearance of the lens driving apparatus.

Industrial Applicability

The lens driving apparatus according to the embodiment can be manufactured in a small size, and can be applied to various electronic appliances equipped with a camera function.

What is claimed is:

1. A lens driving apparatus comprising:
a base;
a housing coupled with the base;
a yoke installed on the base;
a bobbin movably disposed between the base and the housing, wherein the bobbin is coupled with a lens module;
a coil disposed around the bobbin;
a plurality of magnets provided at yoke to face the coil; and
at least one spring disposed on at least one of upper and lower portions of the yoke to return the bobbin,
wherein the plurality of magnets include at least four magnets,
wherein each of the plurality of magnets includes an upper surface, a lower surface, and side surfaces, wherein the side surfaces include at least four side surfaces, and
wherein the side surfaces facing to an external away from the coil include a plurality of flat planes,
wherein the plurality of flat planes are disposed between the yoke and the coil in a horizontal direction.

2. The lens driving apparatus as claimed in claim 1, wherein the at least four side surfaces include at least three flat planes and a curved plane facing the coil.

3. The lens driving apparatus as claimed in claim 1, wherein, in an outer peripheral surface of the coil, an area facing the plurality of magnets is smaller than an area that does not face the plurality of magnets.

4. The lens driving apparatus as claimed in claim 1, wherein, in an outer peripheral surface of the coil, first regions facing the plurality of magnets and second regions that do not face the plurality of magnets are alternately disposed.

5. The lens driving apparatus as claimed in claim 1, wherein the coil has eight side surfaces and eight edges.

6. The lens driving apparatus as claimed in claim 5, wherein the side surfaces of the coil facing the magnets are curved.

7. The lens driving apparatus as claimed in claim 1, wherein the yoke includes a horizontal plate and a vertical plate protruding from the horizontal plate, and wherein the horizontal plate of the yoke has a polygonal shape and the vertical plate of the yoke is provided at each corner edge of the horizontal plate.

8. The lens driving apparatus as claimed in claim 7, wherein the yoke further comprises a vertical wall that protrudes from an inner peripheral portion of the horizontal plate.

9. The lens driving apparatus as claimed in claim 1, wherein a first spacer is installed between a lower portion of the yoke and the base, and
wherein one side of a first spring of the at least one spring is supported at a region between the first spacer and the base.

10. The lens driving apparatus as claimed in claim 1, wherein a second spacer is installed between an upper portion of the yoke and the housing, and
wherein one side of a second spring of the at least one spring is supported at a region between the second spacer and the housing.

11. The lens driving apparatus as claimed in claim 1, wherein the base has a rectangular shape, and a coupling member protrudes upward from each corner edge of the base.

12. The lens driving apparatus as claimed in claim 1, wherein the yoke is partially exposed to a side portion of the housing.

13. A lens driving apparatus comprising:
a base formed at a center thereof with a first opening;
a housing coupled with the base and having a second opening corresponding to the first opening;
a yoke installed on the base;
a bobbin movably disposed and coupled with a lens module;
a coil disposed around the bobbin;
a plurality of magnets provided at yoke to face an outer periphery of the coil, wherein each of the plurality of magnets includes an upper surface, a lower surface, and side surfaces, wherein the side surfaces of the plurality of magnets are contacted with the yoke, wherein the plurality of magnets are disposed between the yoke and the coil in a horizontal direction; and
at least one spring installed on at least one of upper and lower portions of the yoke to support the bobbin, wherein a first spacer is installed between a lower portion of the yoke and the base,
wherein one side of a first spring of the at least one spring is supported at a region between the first spacer and the base,
wherein the coil includes at least eight outer side surfaces and at least eight edges between the eight outer side surfaces.

14. The lens driving apparatus as claimed in claim 13, wherein at least four outer side surfaces of the at least eight outer side surfaces of the coil face the plurality of magnets.

15. The lens driving apparatus as claimed in claim 13, wherein the at least four outer side surfaces of the coil facing the plurality of magnets are curved.

16. The lens driving apparatus as claimed in claim 13, wherein, in an outer peripheral surface of the coil, an area facing the plurality of magnets is smaller than an area that does not face the at least four magnets.

17. The lens driving apparatus as claimed in claim 13, wherein the side surfaces of the plurality of magnets include at least four side surfaces, and
wherein the at least four side surfaces include at least three flat planes and a curved plane.

18. A lens driving apparatus comprising:
a base formed at a center thereof with a first opening;
a housing coupled with the base and having a second opening corresponding to the first opening;
a yoke installed on the base;

a bobbin movably disposed and coupled with a lens module;

a coil disposed around the bobbin;

at least four magnets provided at yoke to face the coil;

a first and second spring disposed on lower and upper lower portions of the yoke to support the bobbin, a spacer installed between an upper portion of the yoke and the housing.

19. The lens driving apparatus as claimed in claim 18, wherein, in an outer peripheral surface of the coil, an area facing the at least four magnets is smaller than an area that does not face the at least four magnets, wherein, in an outer peripheral surface of the coil, first regions facing the at least four magnets and second regions that do not face the at least four magnets are alternately disposed.

20. The lens driving apparatus as claimed in claim 18, wherein each of the at least four magnets includes an upper surface, a lower surface, and side surfaces, wherein the side surfaces include at least four side surfaces, and wherein the at least four side surfaces include at least three flat planes and a curved plane.

* * * * *